Patented July 28, 1925.

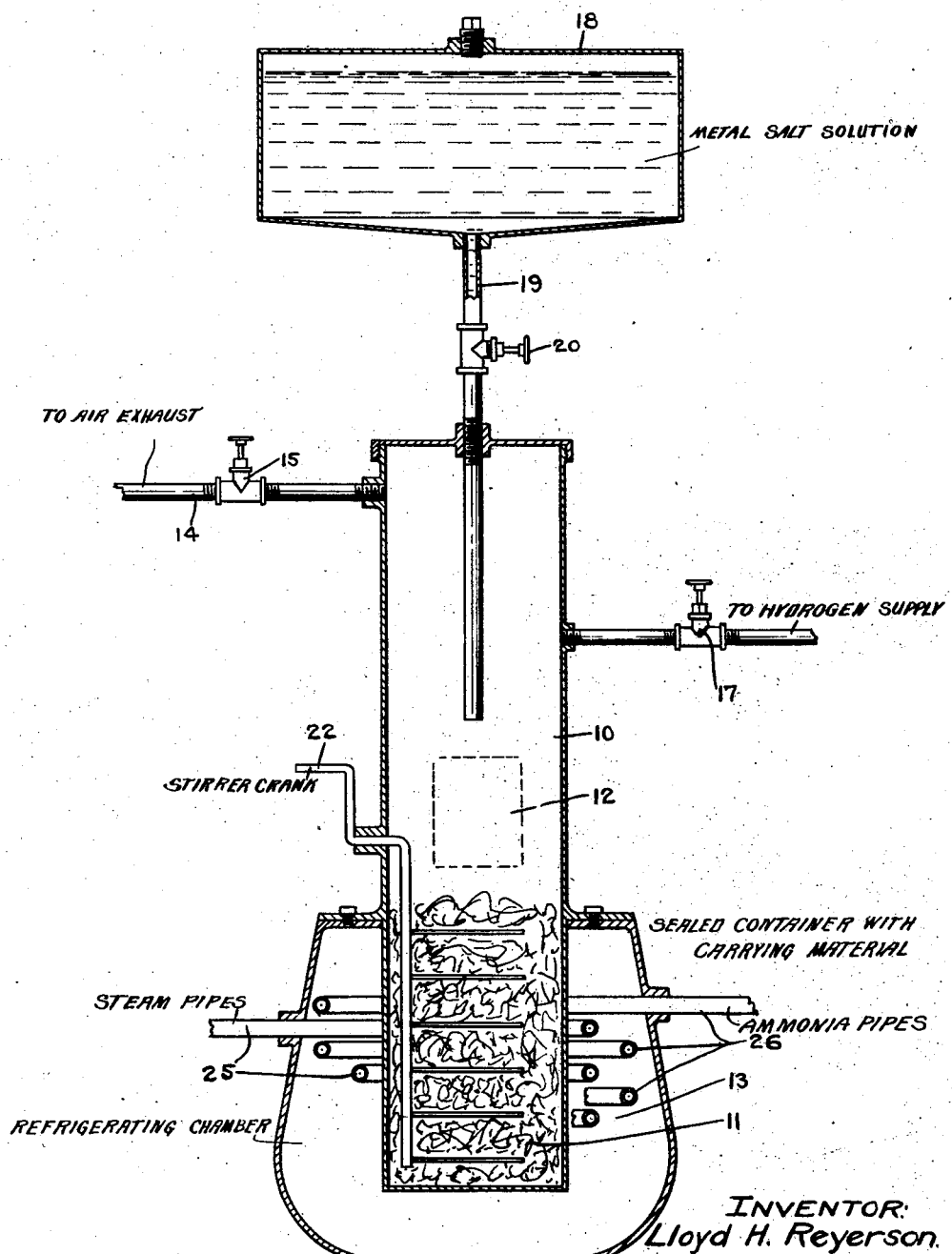

1,547,236

UNITED STATES PATENT OFFICE.

LLOYD H. REYERSON, OF MINNEAPOLIS, MINNESOTA.

METHOD OF PREPARING CATALYST BY THE PRECIPITATION OF FINELY-DIVIDED METAL UPON AND IN SILICA GEL.

Application filed September 15, 1922. Serial No. 588,346.

*To all whom it may concern:*

Be it known that I, LLOYD H. REYERSON, a citizen of the United States, residing at Minneapolis, in the county of Hennepin and State of Minnesota, have invented certain new and useful Improvements in Methods of Preparing Catalyst by the Precipitation of Finely-Divided Metal upon and in Silica Gel, of which the following is a specification.

My invention relates to a method of preparing catalyst by the precipitation of finely divided metal upon and in silica gel. Catalysts are substances which are employed in chemical industry and have the effect of increasing the speed of chemical reactions and permit said reactions to take place efficiently at lower temperatures than would be true if no catalysts were employed. Specifically, catalysts are employed in such commercial processes as the hydrogenation of oils, the synthetic preparation of ammonia from its elements and oxidation reactions in connection with many industrial processes. Heretofore catalysts have consisted of finely divided substances or finely divided metals as well as some substances in solution. A difficulty in the past has been in obtaining metals in a sufficiently finely divided state at a reasonable cost for production of suitable catalysts; and it is the object of my invention to prepare catalysts of finely divided metals wherein the metal will be in an extremely finely divided state, highly available for use as a catalyst and the cost of procuring the same will be reasonable in comparison with the cost of obtaining other similar catalysts.

Fundamentally my process consists in the use of a salt solution of some metal below hydrogen in the electromotive force series, such as salts of copper, silver and platinum in conjunction with silica gel a porous material with ultra microscopic pores so that the said metal will be precipitated upon and in the silica gel in an extremely finely divided condition. Other metals which may be employed are arsenic, bismuth, antimony, mercury and gold; and other substances may be employed in the place of the silica gel, such as kieselguhr, finely divided sand or clay and similar substances.

Specifically my process consists in taking the substance which is to receive upon its surface the precipitated finely divided metal, preferably silica gel, subjecting it simultaneously to the action of a vacuum pump and heat by which means the adsorbed gases of all descriptions held upon the surface of the particles constituting the carrying material may be practically completely removed therefrom. Thereafter, and while retaining the material in the vacuum with effective prevention of admission thereto of air or other gas, the same is cooled to or below room temperature; and when the temperature has been brought to about room temperature hydrogen gas is admitted to fill the vacuum and allowed to remain in contact with the carrying material or silica gel for a suitable period of time during which the temperature of the material is still further lowered by the application of freezing mixtures or other cooling means to a temperature of from fifteen to thirty degrees below zero centigrade. The material is allowed to stand at this temperature and in contact with hydrogen gas until complete equilibrium is obtained, which means that the material has adsorbed the maximum possible amount of hydrogen gas. After this point of adsorption has been reached a solution of the particular metal salt employed, such as a solution of copper sulphate or copper nitrate, silver nitrate or platinum chloride is admitted and poured over the carrying material or silica gel within the hydrogen-filled container. The solution employed may be of any degree of concentration, but preferably will be a moderately dilute solution, a normal solution or less.

After the salt solution has been introduced sufficient agitation may be employed to insure impregnation of the carrying material in the solution. After this has been secured the material and solution are allowed to remain in contact for a sufficient length of time to complete the reaction, which immediately begins to take place. This reaction consists in the reduction of the metallic ion of the salt in solution to the metallic state by the adsorbed hydrogen. As this reduction takes place the metal will displace the hydrogen upon the surface of the particles of the carrier, being thus precipitated upon that surface in an extremely finely divided condition.

The single figure of the drawing, forming part of this application, illustrates diagrammatically such an apparatus as may be employed in carrying out the invention. This illustrates at 10 a receptacle or container adapted to receive the carrying material such as silica gel, indicated therein at 11, and which is introduced into and withdrawn from the container through a suitable opening, indicated in dotted lines at 12, and which should be made so as to hermetically seal the container. Surrounding the lower portion of the container as shown at 13 is any suitable arrangement for heating and cooling the contents of the container 10 such as a brine bath having therein steam pipes 25 and ammonia pipes 26 which can be alternately operated to raise the temperature or to lower it as the practise of the process may require. A pipe 14 opened and closed by an airtight valve 15 leads to an aspirator or vacuum pump, not shown, by means of which sufficient vacuum may be obtained within the receptacle 10. A second pipe 16 controlled by airtight valve or cock 17 leads to the hydrogen supply. A tank 18 containing the salt solution has connection through a feed pipe 19 controlled by airtight cock 20 with the interior of the chamber 10.

The practice of the process with this apparatus will be quite apparent. The material, such as silica gel, is introduced into the chamber at 11. Cocks 17 and 20 are closed and cock 15 is opened and exhaustion of gas within the chamber 10 proceeds until the maximum exhaustion has been reached and the adsorbed gases on the silica gel have been as nearly completely withdrawn as is physically possible, the contents being subjected to a considerable degree of heat while the exhaustion is taking place. After the exhaustion of air and other gases, including the adsorbed gases from the chamber 10, the carrier is cooled by means of 13 to about room temperature. Then cock 15 being closed cock 17 is opened, permitting hydrogen to fill the vacuum and contact with the silica gel. By the use of the cooling pipes in 13 the temperature is then still further reduced to a point from fifteen to thirty degrees below zero centigrade and the material remains in contact with the hydrogen gas until no more hydrogen gas flows into the container, or, stated in another way, until adsorption of hydrogen gas by the carrying material has ceased. The cock 17 is then closed and the cock 20 opened, permitting the salt solution to flow in upon the silica gel or other carrier material in the container 10. After a sufficient amount of the salt solution has been admitted the silica gel or other carrier may be suitably agitated by means of a stirrer 21 operated by hand crank 22 to permit the solution to thoroughly impregnate all parts of the carrying material therein. Immediately upon contact of the salt solution with the carrying material having on its surface the adsorbed hydrogen, a reaction takes place whereby the metallic ion of the salt in solution is reduced to the metallic state by the adsorbed hydrogen and the salt changed to the corresponding acid. As has already been pointed out, the particles of metal thus reduced are precipitated upon the surface of the carrier in an extremely finely divided state, the salt and silica gel are left in contact for a considerable period of time (from twelve hours to thirty-six hours), sufficient to permit the reduction reaction to be fully completed. The product, that is the carrying material, is thereafter removed from the container 10, sufficiently drained and dried, and is ready for the market, constituting a catalyst of the highest degree of efficiency produced at very moderate cost.

I claim:

1. A catalyst consisting of metal precipitated in films of the order of molecular thickness upon all surfaces of a porous carrying material, whose pores are of ultra microscopic proportions.

2. A catalyst consisting of metal precipitated in films of the order of molecular thickness upon all surfaces of silica gel.

3. The method of making catalysts which consists in producing a practical vacuum in and about finely divided carrying material for removing the adsorbed gases therefrom, thereafter causing hydrogen gas to contact with such material whereby hydrogen will be adsorbed upon the surfaces thereof, bringing a solution of a metal salt below hydrogen in the electromotive force series into contact with such carrying material with its adsorbed hydrogen, and keeping said material and salt solution in contact a sufficient period of time to permit reduction of the metal ion of the salt solution to the metallic state and its precipitation in finely divided condition upon the surfaces of the carrying material.

4. The method of making catalysts which consists in producing a practical vacuum in and about finely divided carrying material and simultaneously heating said material for removing the adsorbed gases therefrom, thereafter causing hydrogen gas to contact with such material whereby hydrogen will be adsorbed upon the surfaces thereof, bringing a solution of a metal salt below hydrogen in the electromotive force series into contact with such carrying material with its adsorbed hydrogen, and keeping said material and salt solution in contact a sufficient period of time to permit reduction of the metal ion of the salt solution to the metallic state and its precipitation in finely divided condition upon the surfaces of the carrying material.

5. The method of making catalysts which consists in producing a practical vacuum in and about finely divided carrying material and simultaneously heating said material, for removing the adsorbed gases therefrom, thereafter causing hydrogen gas to contact with such material and lowering the temperature of the material while the hydrogen gas is in contact therewith, whereby hydrogen will be adsorbed upon the surfaces thereof, bringing a solution of a metal salt below hydrogen in the electromotive force series into contact with such carrying material with its adsorbed hydrogen, and keeping said material and salt solution in contact a sufficient period of time to permit reduction of the metal ion of the salt solution to the metallic state and its precipitation in finely divided condition upon the surfaces of the carrying material.

6. The method of making catalysts which consists in producing a practical vacuum in and about finely divided material for removing the adsorbed gases therefrom, thereafter causing hydrogen gas to contact with such material and lowering the temperature of the material while the hydrogen gas is in contact therewith, whereby hydrogen will be adsorbed upon the surfaces thereof, bringing a solution of a metal salt below hydrogen in the electromotive force series into contact with such carrying material with its adsorbed hydrogen, and keeping said material and salt solution in contact a sufficient period of time to permit reduction of the metal ion of the salt solution to the metallic state and its precipitation in finely divided condition upon the surfaces of the carrying material.

7. The method of making catalysts which consists in producing a practical vacuum in and about a silica gel for removing the adsorbed gases therefrom, thereafter causing hydrogen gas to contact with the silica gel whereby hydrogen will be adsorbed upon the surfaces thereof, bringing a solution of a metal salt below hydrogen in the electromotive force series into contact with the silica gel with its adsorbed hydrogen and keeping the silica gel in a salt solution a sufficient time to permit reduction of the metal ion of the salt solution to the metallic state in its precipitation in finely divided condition upon the surfaces of the silica gel.

8. The method of making catalysts which consists in producing a practical vaccum in and about silica gel and simultaneously heating said silica gel, thereafter causing hydrogen gas to contact with the silica gel and lowering the temperature of the material while the hydrogen gas is in contact therewith, whereby hydrogen will be adsorbed upon the surfaces thereof, bringing a solution of a metal salt below hydrogen in the electromotive force series into contact with such carrying material with its adsorbed hydrogen, and keeping said material and salt solution in contact a sufficient period of time to permit reduction of the metal ion of the salt solution to the metallic state and its precipitation in finely divided condition upon the surfaces of the carrying material.

9. The method of making catalysts which consists in producing a practical vacuum in and about finely divided material for removing the adsorbed gases therefrom, thereafter causing hydrogen gas to contact with such material and lowering the temperature of the material while the hydrogen gas is in contact therewith to a temperature of between fifteen degrees and thirty degrees below zero centigrade, whereby hydrogen will be adsorbed upon the surfaces thereof, bringing a solution of a metal salt below hydrogen in the electromotive force series into contact with such carrying material with its adsorbed hydrogen, and keeping said material and salt solution in contact a sufficient period of time to permit reduction of the metal ion of the salt solution to the metallic state and its precipitation in finely divided condition upon the surface of the carrying material.

In testimony whereof I hereunto affix my signature.

LLOYD H. REYERSON.